United States Patent
Sant et al.

(10) Patent No.: US 6,169,896 B1
(45) Date of Patent: Jan. 2, 2001

(54) SYSTEM FOR EVALUATING COMMUNICATION NETWORK SERVICES

(75) Inventors: Deepak Sant, Fremont; Gordon Spencer, Saratoga, both of CA (US)

(73) Assignee: Emerald Bay Systems, Inc., Milpitas, CA (US)

( * ) Notice: Under 35 U.S.C. 154(b), the term of this patent shall be extended for 0 days.

(21) Appl. No.: 09/037,120

(22) Filed: Mar. 9, 1998

Related U.S. Application Data (60) Provisional application No. 60/040,475, filed on Mar. 12, 1997.

(51) Int. Cl.[7] ........................................... H04B 7/00
(52) U.S. Cl. .................. 455/424; 455/423; 455/67.4; 455/69; 455/70; 379/5; 379/9
(58) Field of Search ................... 455/423, 424, 455/425, 426, 446, 67.4, 69, 70, 503; 379/1–15; 370/252, 253, 352

(56) References Cited

U.S. PATENT DOCUMENTS

| | | |
|---|---|---|
| 4,570,265 * | 2/1986 | Thro ....................................... 455/503 |
| 4,977,399 | 12/1990 | Price et al. . |
| 5,023,900 | 6/1991 | Tayloe et al. . |
| 5,398,276 | 3/1995 | Lemke et al. . |
| 5,425,076 | 6/1995 | Knippelmier . |
| 5,490,204 * | 2/1996 | Gulledge ............................... 455/423 |
| 5,504,800 | 4/1996 | Yehushua et al. . |
| 5,528,661 | 6/1996 | Siu et al. . |
| 5,539,804 | 7/1996 | Hong et al. . |
| 5,572,570 * | 11/1996 | Kuenzig ................................... 379/1 |

* cited by examiner

*Primary Examiner*—Dwayne D. Bost
*Assistant Examiner*—Temica Davis
(74) *Attorney, Agent, or Firm*—Robert S. Kelly

(57) ABSTRACT

A system for directly comparing on a service quality basis a plurality of wireless network services includes a vehicle containing a plurality of phones for different wireless networks and a fixed location for receiving calls from or transmitting calls to the vehicle. A call is initiated at the vehicle or fixed location, and a series of preselected messages are alternately transmitted between the vehicle and the fixed end through each of the networks with each message being quality graded with voice recognition software or data comparison techniques so that quality grades for each network are provided which can be combined and compared in various ways. The vehicle also includes a global positioning satellite system so that the vehicle location and speed can be tagged to each transmitted message to compare the relative quality of the networks within specific portions of the geographical area covered by the vehicle.

23 Claims, 8 Drawing Sheets

Fig_4

Fig_5 fig_6

Fig-7 fig-8 fig-9

SYSTEM FOR EVALUATING COMMUNICATION NETWORK SERVICES

REFERENCE TO PRIOR APPLICATION

This application claims the benefits of U.S. Provisional Application No. 60/040,475, filed Mar. 12, 1997 and entitled: METHOD OF EVALUATING WIRELESS NETWORK SERVICES

BACKGROUND OF THE INVENTION

1. Field of the Invention

The present invention pertains to systems and methods for testing communication networks or systems, and more particularly, it pertains to methods and systems for testing the service quality of various communication networks in a side-by-side comparison fashion.

2. Description of the Prior Art

The world of communication services, and particularly wireless services, is at a strategic point. Heretofore, in addition to the conventional public switched telephone network (PSTN), there have generally been only two "cellular" service providers in any given market. With the arrival of personal communication services (PCS) and enhanced specialized mobile radio (ESMR) networks along with the various digital upgrades undertaken by the cellular incumbents, the choice of wireless network services in almost all markets is rapidly increasing and can be expected to increase by a factor of four or more in the very near future. The addition of low earth orbiting satellite (LEOS) networks and the advent of two-way paging networks (narrowband PCS) further increases the number of wireless alternatives in the marketplace. The network implementation of the technology in a given service area is one of the most important factors in creating a high quality service for the subscriber. The same technology can be implemented in a variety of ways (e.g., number and location of cell sites, frequency plans, handoff and threshold settings, etc.) to offer vastly different experiences to the end user. In most large cities, the existing cellular networks offer decent indoor and outdoor coverage but suffer from capacity (busy signals) and interference (static, co-channel clutter, dropped calls, etc.) effects. The latter shortcomings are accentuated by the segmentation of the cellular spectrum to accommodate digital services. With smaller subscriber bases, the newer PCS services do not generally suffer from traffic related impairments; however, obtaining locations and erecting antennas for cell sites is getting to be increasingly difficult for a variety of reasons which results in potentially poorer coverage for the newer entrants.

An evaluation problem immediately presents itself when considering network quality, which problem is accentuated by the proliferation of different types of communication services as pointed out above. With all of the various factors that affect cellular service and particularly the quality thereof, a problem has arisen in being able to compare the network service attributes in an objective manner in order to properly rate them so that one can make an informed choice of provider and type of service for a particular area of usage. It may also be critical to compare the various wireless services with conventional (landline) communication networks in order to properly evaluate the quality of the service provided.

In the past, various systems and methods have been used for the testing of a specific communication network service, particularly a wireless service, over a varied geographic area. These systems generally were designed to provide data on a number of engineering parameters such as signal strength, etc. For example, U.S. Pat. No. 4,977,399 to Price et al discloses a system which uses a mobile unit, i.e., a van, which includes means for simultaneously receiving radio signals including test data from a plurality of different transmitters and a computer for processing the received test data from the radio transmitters to directly compare the results. As the mobile unit travels, its position is simultaneously recorded by means of a LORAN antenna so that the geographical position information can be directly related to the data transmission. The system is thus able to provide information relating to the range and quality of the radio paging signals as they are received at various sites from a particular mobile station travelling over the varied geographic area.

U.S. Pat. No. 5,023,900 to Tayloe et al discloses a system and method of evaluating the cellular radio coverage of a geographic area serviced by a digital cellular radio telephone communications system. A mobile unit transmits data to a plurality of base stations of the cellular radio telephone communication system within the geographic area and simultaneously transmits information with regard to its specific (longitude, latitude) location. Each of the base stations transmits the information to a central operation maintenance and control unit which includes a computer that processes such information to accurately determine the performance of the cellular phone system as the phone is moved about the particular geographic area under testing.

A further wireless testing method and system is disclosed in U.S. Pat. No. 5,398,276 to Lemke et al which discloses a portable cellular telephone signal strength analyzer which includes a laser range finder with a built-in compass to input data on the geographic locations of the analyzer as it is moved about a specific geographic area, e.g., a shopping mall or office building.

Other United States patents which disclose testing systems for wireless networks and particularly cellular networks include the patent to Knippelmier U.S. Pat. No. 5,425,076 which discloses a measurement module located at a base station that initiates a call to one or more responders at remote locations and monitors the quality of the calls and receptions with a wide variety tests of both engineering parameters and service quality; the patent to Yehushua et al U.S. Pat. No. 5,504,800 which discloses a system for testing cellular phones that includes a series of transmitted and received messages generated in response to each other and which includes a computer which provides a quality evaluation of the transmission/reception; the patent to Siu et al U.S. Pat. No. 5,528,661 which discloses a self-diagnostic test routine for use in generating test signals in remote measurement units which communicate with various subscriber lines in the vicinity and wherein the testing equipment at the remote measuring units are checked periodically or continuously against various preset levels to determine the status thereof; the patent to Hong et al 5,539,804 which discloses a system for monitoring call quality over a plurality of transmission lines with such call quality including signal-and-noise ratios, speech level, noise level, echo characteristics, etc., and which system uses a central computer operating through a public switched telephone network to receive calls from the various transmission lines; and the patent to Kuenzig 5,572,570 which discloses a method of testing a telecommunication system by a sequence of voice and non-voice signals by comparing the responses from the tested systems with predetermined standards.

SUMMARY OF THE INVENTION

With the method and system of the present invention, there is provided a system which can directly compare in side-by-side comparison fashion different types of network communication services or different providers within a single type of network communication service as, for example, a plurality of cellular phone services within a given service area. The testing routines are carried out and the test results are provided with the end user in mind.

Thus, a means is provided at a first location, which may be a mobile vehicle continuously moving through a geographic service area, for sending a first set of identical preselected messages to a second, fixed location through the plurality of network communication services being tested. At the second location a second set of identical preselected messages are sent back to the first location with each of the messages of the second set being sent directly in response to the corresponding received first message. Then, means are provided at each location for quality grading each of the messages received and for providing a score with a comparison of the scores between the various services providing a comparative quality grading for the different communication network services or providers tested.

Additionally, when wireless services are being evaluated and a mobile vehicle is used as the first location, geographic position and vehicle speed information may be correlated to each message in order to better evaluate the different wireless networks throughout the varied terrain of the geographic area under test.

DESCRIPTION OF THE PREFERRED EMBODIMENTS

While the system of the present invention is particularly designed to evaluate, on a side-by-side comparison basis, communication network services of various types, including particularly wireless network services, in the particular embodiment of the invention shown and described herein, the communication network services will consist of a plurality of wireless cellular networks all operating within a given geographic area.

Figure 1:
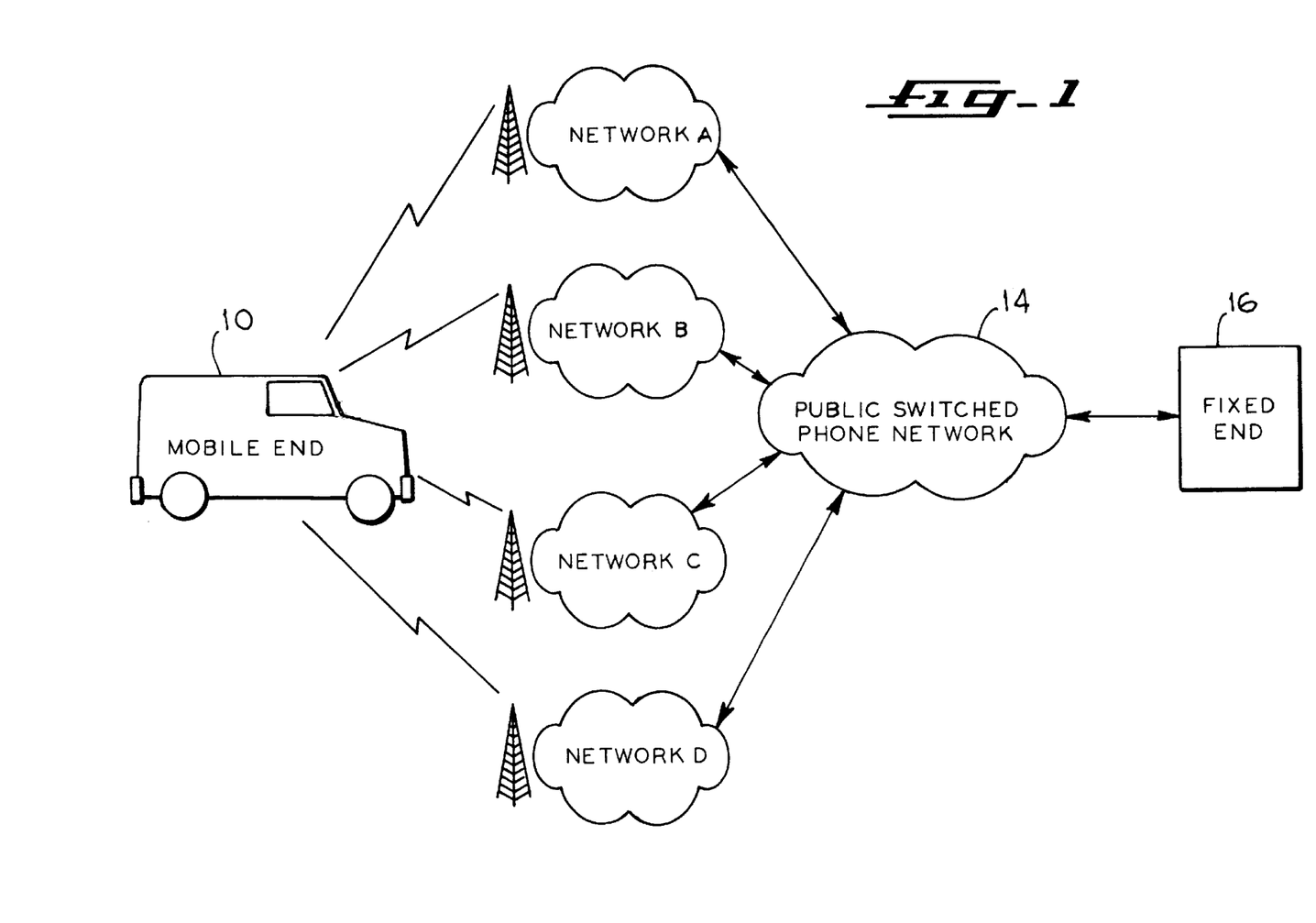
FIG. 1 is a diagrammatic illustration of a wireless network evaluating system utilizing the present invention.

The general arrangement of the system of the present invention for performing a wireless network evaluating method, particularly for competing cellular phone service providers, is schematically shown in FIG. 1. One or more mobile units 10 are provided which drive about the various changing terrain of the area to be evaluated with each mobile unit being provided with a plurality of individual phones 12 (FIG. 4) each such phone being adapted to communicate with one of the particular networks to be evaluated. As shown in. the example of FIG. 1, four separate networks are tested, e.g., networks A.B,C and D. As the mobile unit 10 moves about the general calling area to be monitored, calls are made from the cellular phones carried in this unit by simultaneous radio transmissions to the various radio towers associated with the network services A–D from which towers the calls can proceed in conventional fashion via the conventional public switched phone network 14 to a single, fixed-end unit 16 which has been provided at some appropriate location, preferably, but not necessarily, within the area of evaluation. Both the mobile unit 10 and the fixed-end unit 16 include computers (CPU) and appropriate software for initiating calls, for receiving calls, and for evaluating the quality of the individual segments of information (voice or data) transmitted during the calls by means of conventional voice recognition or authentication software or conventional digital data comparison techniques. Such units 10, 16 also include the capability of storing and retaining the various data accumulated during the calls and for making overall quality evaluations based on the individual quality evaluations of the separate voice or data transmission segments.

Figure 2:
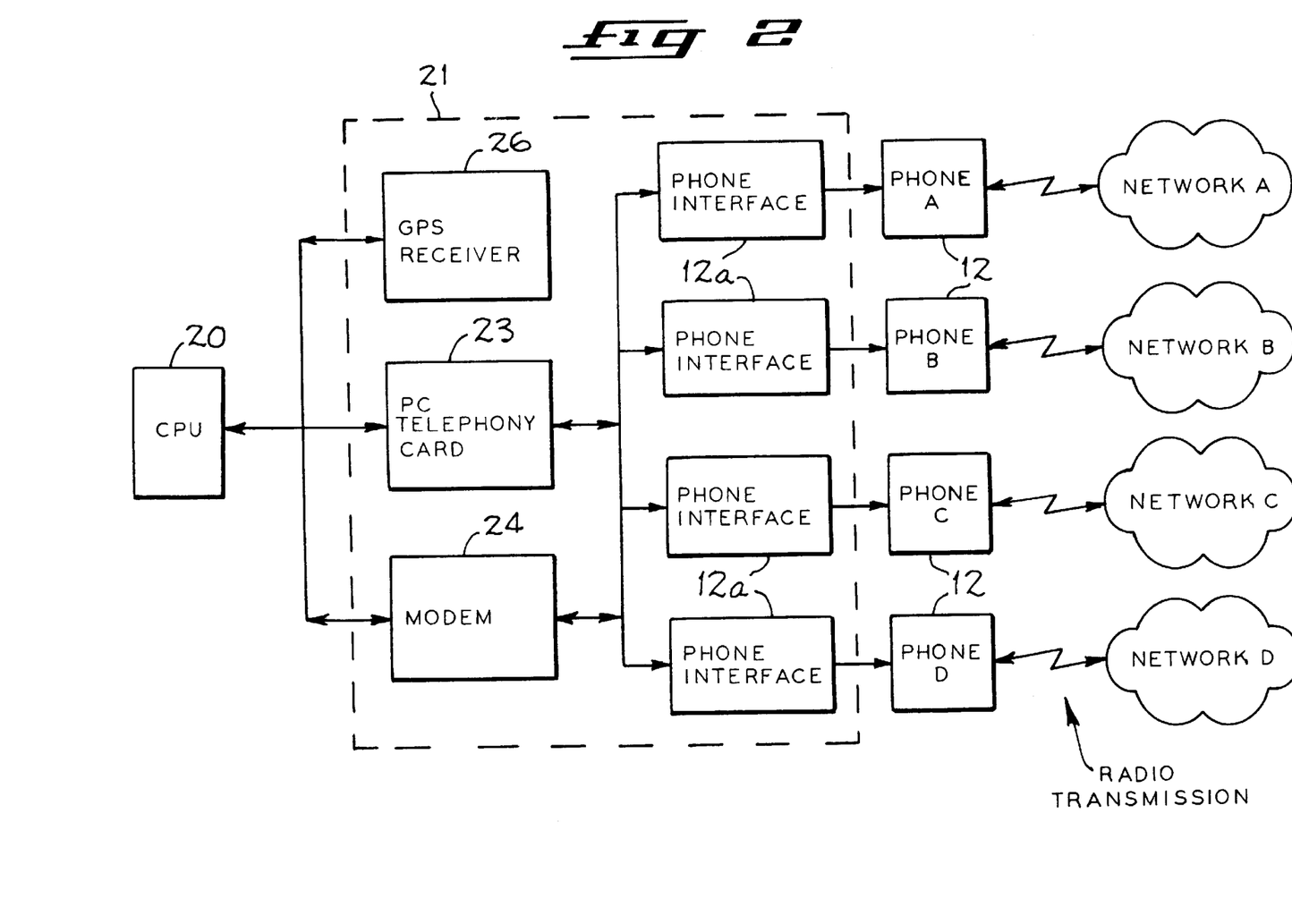
FIG. 2 is a block diagram illustration of the components of the system of FIG. 1 at the mobile end thereof.
Figure 4:
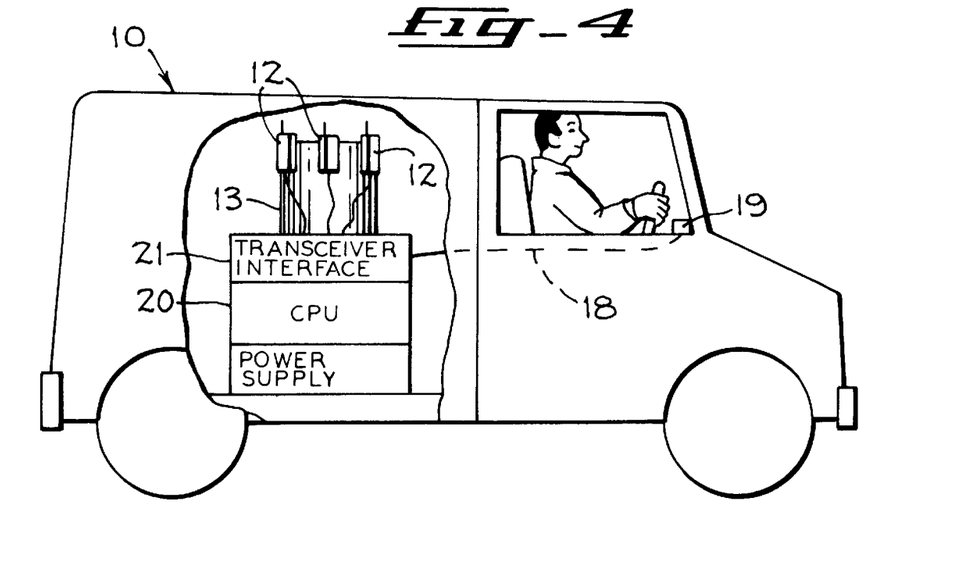
FIG. 4 is a diagrammatic side elevation, partially broken away, of the mobile unit in the system of FIG. 1, particularly illustrating the manner in which the various cellular phones to be evaluated are positioned.

The layout of the equipment at the mobile unit 10 is shown in FIG. 2 and is schematically illustrated in FIG. 4. Thus, as explained above, each of the phones 12 in the mobile unit is particularly adapted to be used with a particular cellular network which is to be evaluated. As shown in FIG. 4, the phones are mounted on a common plane at a level approximately that of the vehicle driver's head where they would normally be used during the making of a call from an automotive vehicle. As can further be seen in FIG. 4, the phones may be mounted upon the upper periphery of an upright cylindrical turret structure 13 that is adapted to sit upon the transceiver interface hardware 21, the computer or central processing unit (CPU) 20, and the power supply 22 located centrally within the vehicle. A connecting line 18 from the transceiver interface 21 to a suitable switchbox 19 on the vehicle dashboard may be provided so that the calling or transmission sequence can be initiated by the vehicle driver.

As can be seen in the block diagram illustration of FIG. 2, the transceiver interface hardware 21 at the mobile unit 10 is comprised of various hardware components that are interfaced between the phones 12 and the computer 20 and which include a conventional voice card or pc-telephony card 23 which is adapted to digitize the analog signals from the phones for transmission to the computer and to convert the various digital information from the computer to the appropriate analog voice signals for transmission over the phone networks. The interface components also include a conventional modem 24 to send and receive the various data files and packets that may be transmitted over the phone lines in addition to the voice recordings, and a conventional global positioning satellite (GPS) receiver 26. A special phone interface unit 12a is provided for each of the phones so that the signals from the voice card 23 can be matched with the particular input jack on each individual phone 12.

Figure 3:
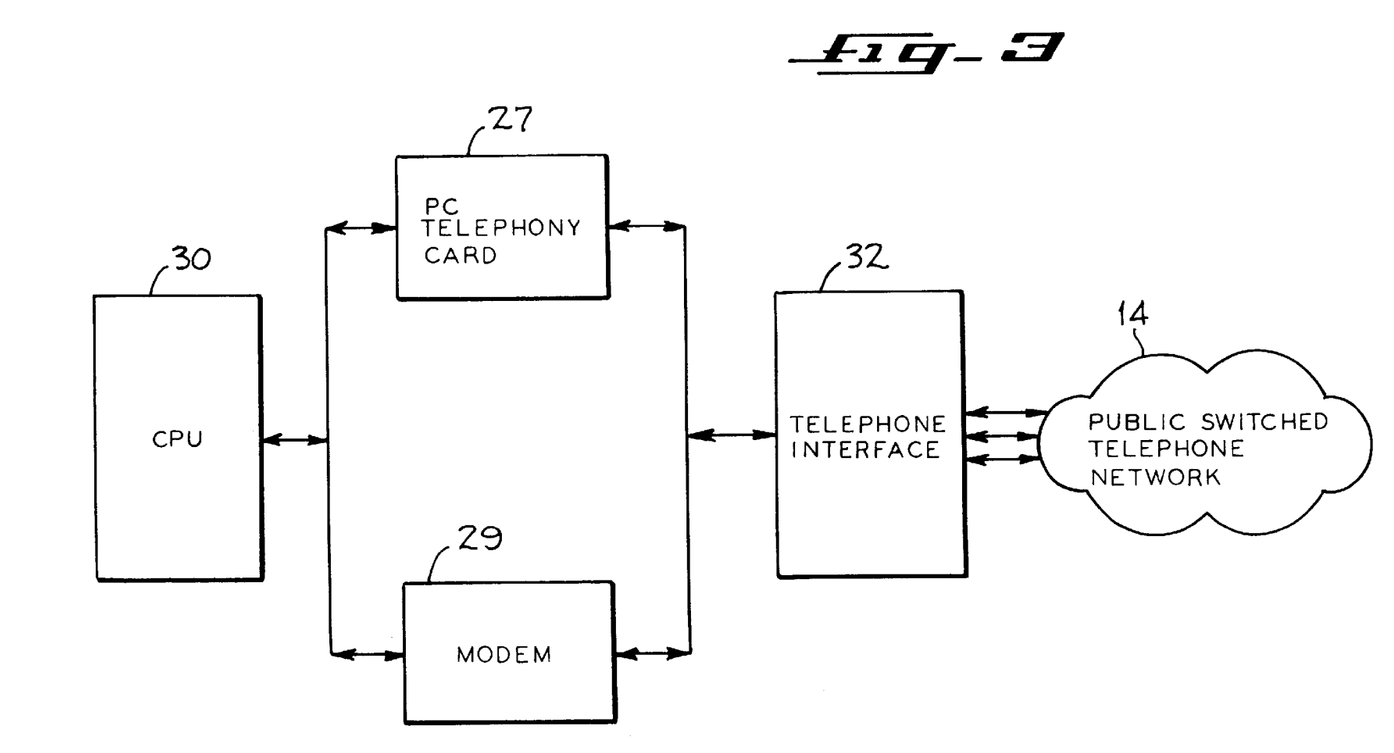
FIG. 3 is a block diagram illustration of the components of the system of FIG. 1 at the fixed end thereof.

At the central or fixed-end location 16, as shown in FIG. 3, a somewhat similar arrangement of components is provided with a computer 30 operating through a conventional voice or pc telephony card 27 (similar to the voice card 23) for interfacing with the local telephone system during voice transmission and a modem 28 (similar to the modem 24) for interfacing with the telephone system during the transmission and reception of data files and packets. A conventional telephone interface arrangement or switchboard 32 is also provided which will be equipped to handle simultaneous calls from all of the mobile phones being tested, and which switchboard is linked in the customary manner to the local public telephone network for receiving and transmitting calls.

The various wireless network telephones to be used in the aforedescribed system are purchased through authorized retail channels and are then integrated without modification into the automated test apparatus as previously pointed out. Clocks within the CPU at the mobile end 10 and fixed-end 16 are synchronized so that the transmission of information therebetween can be appropriately automatically correlated. The GPS receiver 26 at the mobile end 10 (FIG. 2) is set to provide updated vehicle geographic location (latitude, longitude) information as well as vehicle speed information at fixed time intervals (about every four seconds at present) which will be maintained in a separate file and then input into the system during the analysis of the accumulated data so that each individual data segment or voice transmission segment can be accurately tagged as to the particular vehicle location and speed.

The testing process of the present invention is computer controlled and consists of a series of calls each of which can be originated from either the fixed-end 16 or the mobile end 10 in a preselected sequence. Each call will consist of an alternating transmission and reception of information (voice or data), and both the sequencing and the content of each call will be identified for each of the network services A–D being tested. It is an important feature of the present invention that each of these calls is initiated on each of the wireless networks under test at exactly the same time; thereafter, the progress of each individual call is separately monitored and clocked so that the results thereof can be compared. While the calls may vary in duration, they are typically of about two minutes in length. The calls may consist of a voice recording, wherein the calling end randomly picks a sentence from a predetermined vocabulary of sentences with such vocabulary consisting of prerecorded sentences spoken by a variety of speakers and taken from an industry standard such as the diagnostic acceptability measure (DAM) or Harvard sentence sets. Also standard digital data transmission in files or packets may be utilized as a separate call consisting only of the transmission of data. The calls are placed throughout the region of interest at all times of the day with, in a typical testing sequence, about five calls being placed per square mile within the area to be tested. The calls can be originated from either the mobile end or the fixed end, and it is important that both options be used in order to fully test the mobile telephone's capabilities.

Flow charts indicating the programming for the computers 20, 30 at the mobile end 10 and fixed end 16, respectively, are shown in FIGS. 5–9. Thus, with reference to FIG. 5, upon the random initiation of a call at the mobile end 10, the mobile end computer 20 will immediately initiate the record location process (see FIG. 8), i.e., initiate its clock and the GPS receiver 26 to continuously update the vehicle location and speed information at regular intervals. If the initiation of a call is at the fixed end 16, the record location process will be initiated at the mobile end immediately upon the reception of the first message on one of its phones 12. Each computer 20, 30 then determines from the source of the call initiation signal (self-initiated or call response) whether it is the calling end or the called end, and the sequence of steps as set forth in FIGS. 6 and 7, respectively, is then put into operation.

Figure 6:
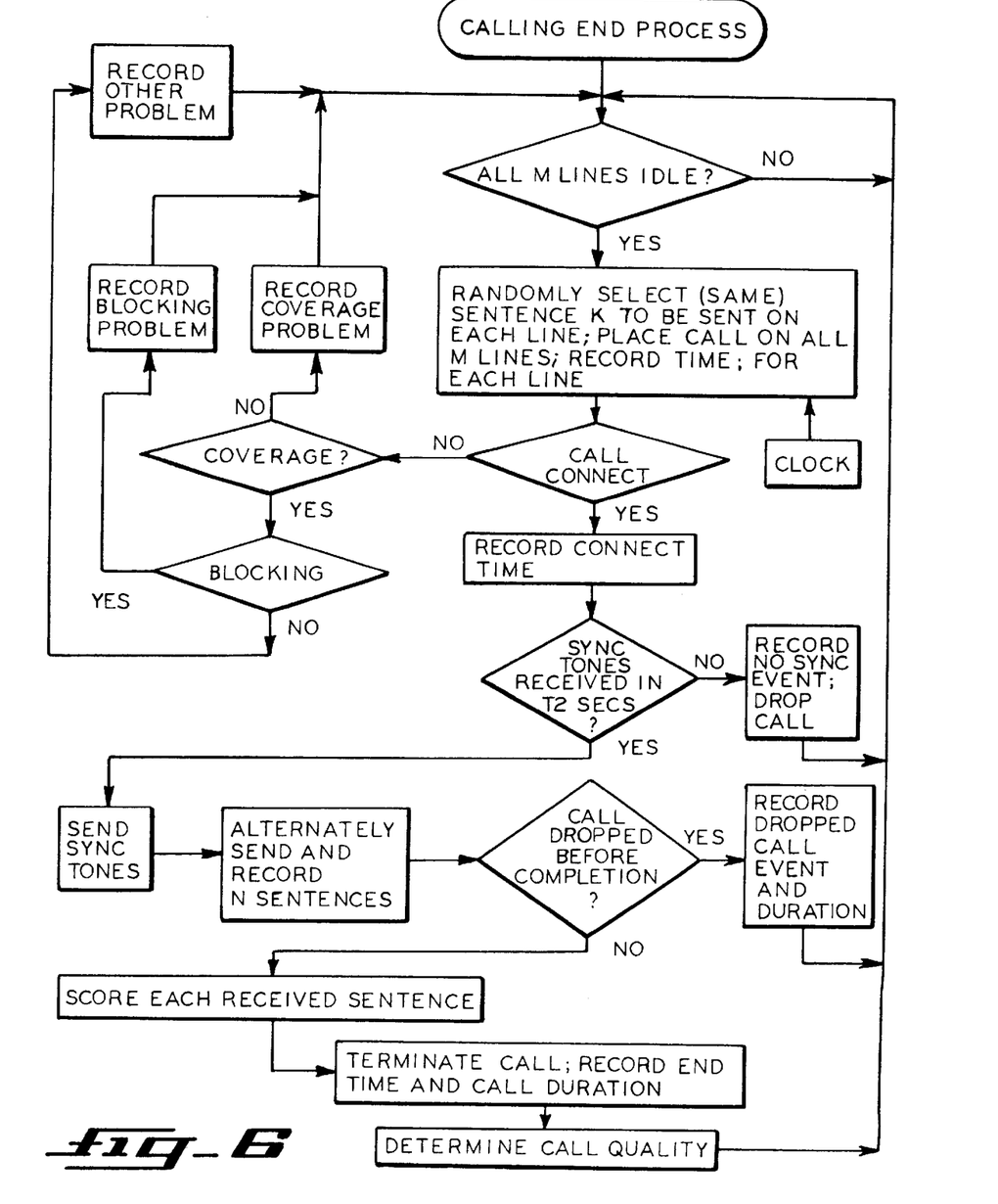
FIG. 6 is a flow chart particularly depicting the computer programming at the calling end during the test sequence.

The calling end process for voice transmission is set forth in the flow chart of FIG. 6. The process will first determine that all of the lines or phones 12 (M=the total number of networks under test) are free for use. The random selection of the sentence to be sent is then made, and a call is simultaneously placed on each of the lines or by each of the phones with the start time thereof being recorded. From that point on each individual call on an individual network is separately monitored as to time with each call segment or sentence being tagged with updated time information. When the call is answered, i.e., an answering call segment sent back to the call initiator, the time information is again recorded, and a series of sync tones (generated in the computer and converted in the voice card 23 for voice transmission) are sent both by the calling end and the called end in order to synchronize the automatic alternating transmission and reception of call segments or messages (e.g., sentences) therebetween during the subsequent duration of the call. Upon the appropriate reception of sync tones back from the called end within a given time interval (T2 seconds), a sync tone is sent to the called end and the transmission of the sequence of voice sentences is initiated, and in the calling sequence set forth, each transmission of a sentence (after the first one) is interspersed between a received sentence from the called end. The transmission quality of each received sentence is scored by conventional voice recognition software to be explained more fully hereinafter. At the end of the calling sequence, i.e., after a predetermined number N of sentences are transmitted, the telephone connection is terminated with the time and call duration being noted. In a manner to be further described, the call quality is then evaluated. As can also be seen from the flow chart of FIG. 6, various circumstances which may arise during the calling sequence will automatically terminate the sequence. For example, if the call fails to connect (i.e., be answered) this is recorded and the reason for such failure to connect (if ascertainable) is similarly recorded, e.g., if the problem is coverage (the wireless phone system is unable to process the call) or blocking (the network is too busy to process the cell). Also, if the transmission and reception of the synchronization tones are not completed within the prescribed time limit T2 so as to initiate the transmission/reception sequence, or if the call ends before its prescribed completion time, such event is similarly recorded.

Figure 7:
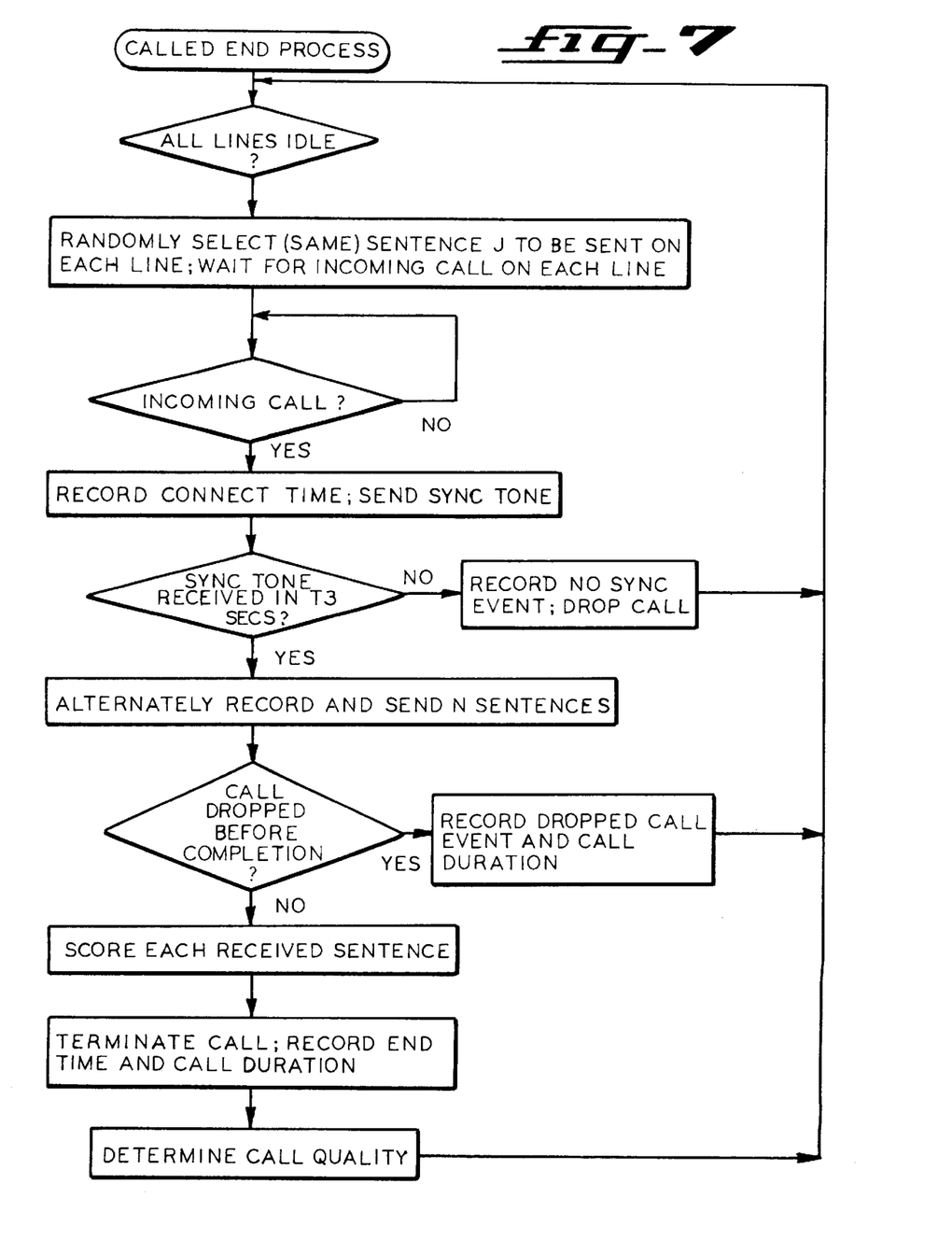
FIG. 7 is a flow chart particularly depicting the computer programming at the called end during the test sequence.

The computer at the called end goes through a similar sequence of steps for voice transmission as set forth in FIG. 7. As can be seen, prior to the reception of an incoming call, a sentence is randomly selected and ready for transmission. Then, upon the reception of an incoming call and after recording the time thereof a sync tone is sent to the calling end in order to synchronize the sentence transmission. When the response sync tone is received from the caller within the prescribed time limit T3 the called end then transmits its sentences at prescribed intervals which in accordance with the predetermined timing sequence fit alternately between the prescribed time intervals of the calling end sentences. As with the FIG. 6 calling end process, each received sentence is individually scored for quality, and the overall call quality is also scored at the end of the calling sequence. Also, as with the calling end program sequence, those events which cause the call to be terminated (e.g., no synchronization, call cut off before its prescribed end, etc.) are recorded along with the appropriate timing information.

Figure 5:
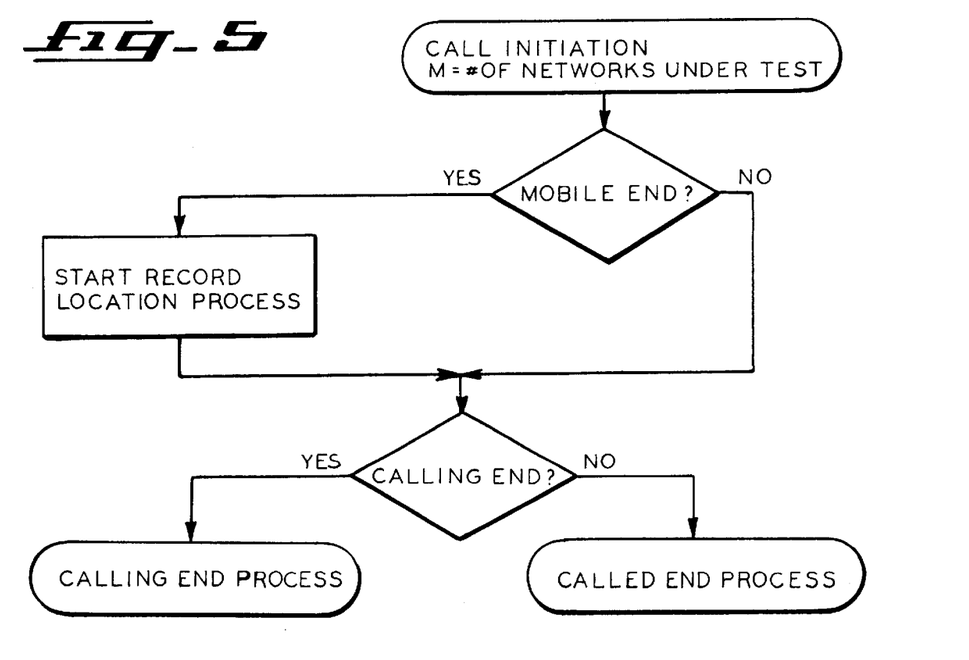
FIG. 5 is a flow chart particularly depicting the computer programming for the subroutine of initiating the calling during a test sequence of the evaluation process.
Figure 8:
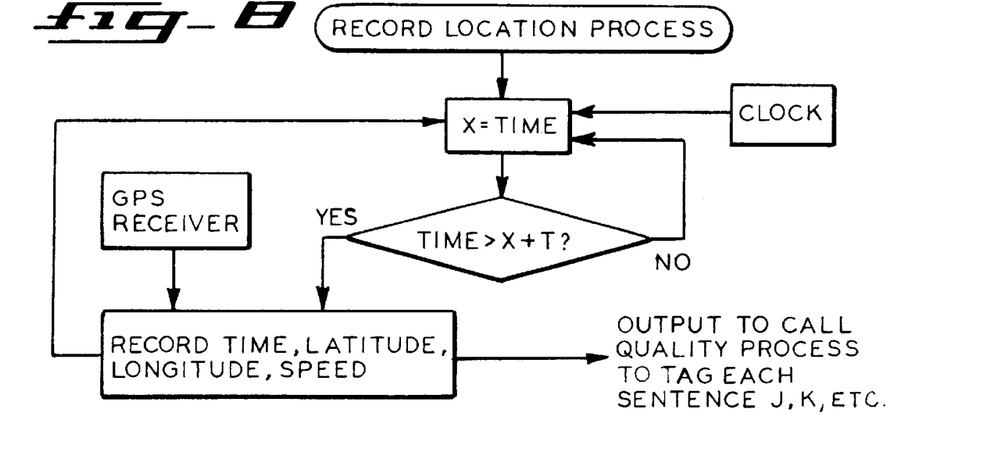
FIG. 8 is a flow chart particularly depicting the computer programming for the subroutine of recording time, position and vehicle speed during the test sequence.

The subroutine for the record location process performed at the mobile end and in the subroutine illustrated in FIG. 5 is set forth in FIG. 8. It will be seen that the system immediately records the time, X, upon initiation of the call and that such time information is updated every T seconds, with T being about four seconds as the system is used at present. At each time update, the vehicle position (longitude and latitude) and speed are also input into the system as indicated. This information is maintained in a table in the computer, and it is used when the call quality process is initiated so that each call segment, i.e., sentence, will be tagged with the correct mobile end location and vehicle speed.

Figure 9:
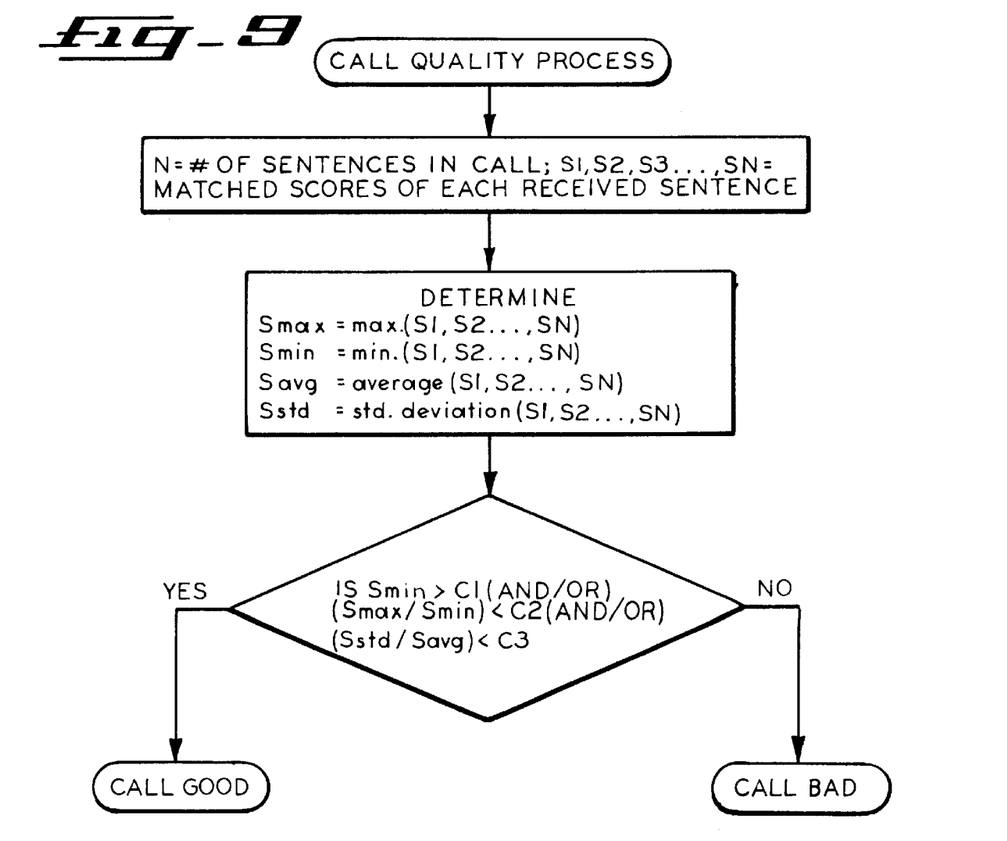
FIG. 9 is a flow chart particularly depicting the computer programming for the subroutine which determines the call quality after the test sequences.

The subroutine for determining the call quality process is set forth in FIG. 9. This process can be performed using conventional voice recognition or voice authentication software, and in the process as shown, all of the voice recognition is done within the computer software. Each received sentence (J, K, etc.) is compared with a template of the expected sentence and a matching score (S1 to SN) is generated using standard speech recognition and verification algorithms with a higher score implying better quality. Then, from each series of matched scores representing the sentences received during a single call the maximum (Smax) and the minimum (Smin) are determined. Also, an average score for each sequence (Savg) is determined and the standard deviation from the average (Sstd) is determined. This information may then be used to make a final evaluation (good or bad) on each call. For example, if Smin is more than some predetermined quality (C1), and/or if the ratio of Smax to Smin is less than some predetermined quality factor (C2) the call may be labelled as "good". Finally, the ratio of the standard deviation (Sstd) to the average quality (Savg) is determined, and/or if this ratio is less than a predetermined threshold value C3 the call may similarly be labeled as "good".

While the foregoing sets forth the transmitting sequence during voice transmission, a similar sequence of steps is utilized during data transmission. For example, predetermined selected digital data files may be transmitted in either direction and the file transfer time recorded. Transmission integrity is determined by comparing the received file with the transmitted file using conventional digital comparison techniques (algorithm not shown) and recording the number of bit errors. The data throughput is determined from the file transfer time and the file size. Also, short bursty transaction oriented packets may be transmitted in either direction to bench mark data system performance for transaction oriented applications.

At the end of the test, data from the fixed and mobile ends is merged based on the time tags thereon so that location to location within the geographic area can be directly compared for each network M being tested. Post analysis of the data can provide a variety of measures for absolute and relative service quality including the following factors: (1) Access—does the call go through on the first attempt, and if not, is it because of lack of coverage or blocking?; (2) connect times—how long does it take to make the connection?; (3) retention—does the call hold through the conversation or does it unexpectedly terminate in midsentence?; (4) quality—is the quality of the call good or bad?; (5) data set-up times—how long does it take to set up a data session?; (6) throughput—what is the data throughput in either direction?; (7) transit delays—what is the one-way and two-way transit delay through the network?

Figure 10:
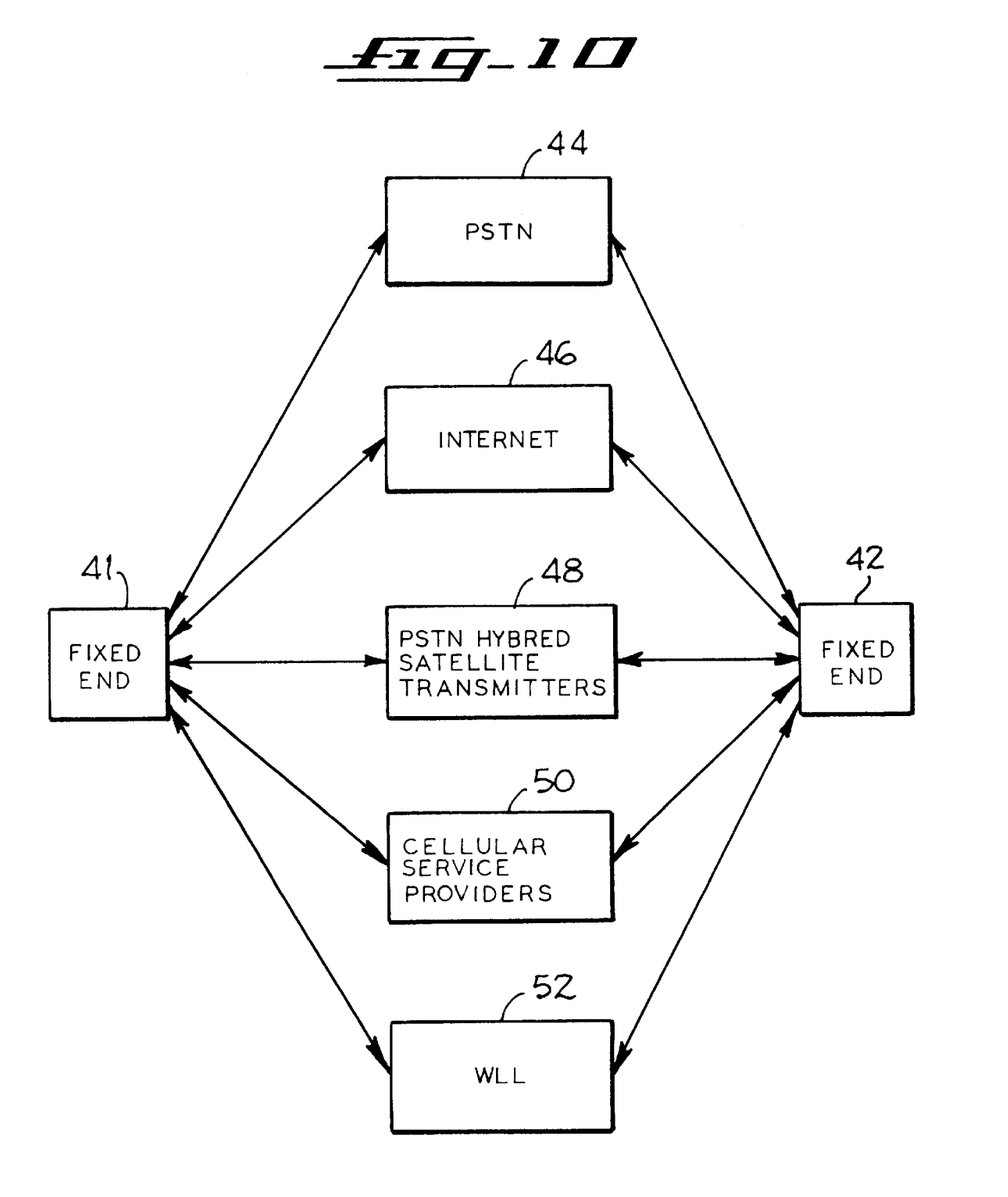
FIG. 10 is a block diagram illustration of the basic components of a second system for evaluating a plurality of different communication network services in accordance with the present invention.

While the foregoing system and method shows a plurality of wireless network systems being tested with the cellular phone end of the network system being located in a mobile vehicle, it is possible to use the same testing process, particularly as set forth in FIGS. 5–9 (but without the GPS unit and any mobile/fixed distinction), to directly compare a plurality of entirely different types of communication network services between a pair of fixed locations. Thus, in FIG. 10, there is shown a system for transmitting information between two fixed locations 41 and 42, each of which contains hardware and software similar to the fixed location arrangement 16 previously described. With such an arrangement, simultaneous side-by-side testing can be made through the local public switched telephone network (PSTN) 44, the internet 46, a PSTN hybrid system using satellite transmitters 48, various local cellular providers 50, and wireless local loop (WLL) systems 52. In this fashion, the various wireless services can be directly compared with the current service standard, the PSTN, for a relative quality grading.

Although the best modes contemplated for carrying out the present invention have been herein shown and described, it will be apparent that modification and variations may be made without departing from what is regarded to be the subject matter of the invention.

What is claimed is:

1. A system for comparing communication network services comprising
   means at a first location for simultaneously sending a first set of identical preselected messages in digital format to a second location through a plurality of different communication network services all of which transmit from said first location,
   means at said second location for receiving said first set of preselected messages and for sending a second set of identical preselected messages in response to said first set of messages back to the means at said first location through the plurality of different communication network services,
   means at each of said locations for quality grading each of the received messages and for providing a score for each received message based on such quality grading,
   whereby the scores for each communication network service can be directly compared to provide a subscriber quality evaluation.

2. A system according to claim 1 wherein each of said first set of preselected messages is comprised of a voice communication and wherein said means for quality grading comprises voice recognition software.

3. A system according to claim 1 wherein said first location is a mobile location, and including means at said first location for determining the geographic position of the first location during each of the sets of messages sent from and received by the first location.

4. A system according to claim 1 wherein said means at said first location for sending includes a plurality of wireless telephones, and further including a mobile vehicle for supporting each of the telephones, the means for sending and the means for quality grading, said mobile vehicle defining said first location.

5. A system according to claim 4 including means in said vehicle for determining the geographical location of the vehicle during each of the sets of messages sent from and received at the first location.

6. A system according to claim 1 wherein said means for sending and receiving at said first and second locations are arranged to send and receive a plurality of pairs of first and second sets of identical preselected messages and wherein said means for quality grading comprises determining a maximum and a minimum score for the received messages of each network service and further determining the ratio of the maximum and minimum scores to evaluate the quality of the network services.

7. A system according to claim 1 wherein said means for sending and receiving at said first and second locations are arranged to send and receive a plurality of pairs of first and second sets of identical preselected messages and wherein said means for quality grading comprises determining an average score for the received messages of each network service and a standard deviation of the scores for the received messages of each network service and further determining the ratio of the standard deviation and the average score to evaluate the quality of the network services.

8. A method for comparing communication network services comprising simultaneously sending a first set of identical preselected messages in digital format from a first location to a second location through a plurality of different communication network services all of which transmit from said first location, receiving the first set of messages at the second location and for each message received on each separate communication network service providing a score based on a quality grading of the message, sending a second set of identical preselected messages from the second location back to the first location through said plurality of different communication network services with each message of the second set for each network service being sent directly in response to the reception of a message of the first set of messages, receiving the second set of messages at the first location and for each message received on each separate communication network service providing a score based on a quality grading of the message, combining the scores for each separate communication network service to obtain a final score, and comparing the final scores for each network service to provide a subscriber network service quality evaluation.

9. A method for comparing communication network services according to claim 8 wherein said first and second sets of preselected messages comprise voice communications and wherein said steps of providing a score comprise using voice recognition software.

10. A method for comparing communication network services according to claim 8 wherein said first location is defined by a mobile vehicle and including the further steps of determining and recording the geographic location of the vehicle during each message sent from or received at said first location.

11. A method for comparing communication network services according to claim 10 including the further steps of determining and recording the vehicle speed during each message sent from or received at said first location.

12. A method of comparing communication network services according to claim 8 including a repetition of the steps of sending and receiving messages so that a plurality of additional pairs of first and second sets of messages are sent and received at the first and second locations prior to the steps of combining and comparing, each message of the first set of messages of said additional pairs of sets of messages being sent directly in response to the reception of a message of the previously sent second set of messages.

13. A method of comparing communication network services according to claim 12 wherein said step of combining the scores for each network service includes the determination of a maximum and a minimum score and a determination of the ratio of the maximum and minimum scores.

14. A method of comparing communication network services according to claim 12 wherein said step of combining the scores for each network service includes the determination of the average score and a standard deviation of the scores and a further determination of the ratio of the standard deviation and the average score.

15. A method for comparing wireless communication network services comprising simultaneously sending a first set of identical preselected messages in digital format from a moving mobile vehicle to a geographically fixed location through a plurality of different wireless communication network services, each of such services having their transmitting means on said mobile vehicle, receiving the first set of messages at the fixed location and for each message received on each separate communication network service providing a quality grading of the message, sending a second set of identical preselected messages from the fixed location back to the vehicle through said plurality of different wireless communication network services with each message of the second set for each network service being sent directly in response to the reception of a message of the first set of messages, receiving the second set of messages at the vehicle and for each message received on each separate communication network service providing a quality grading of the message, and comparing the quality grading for each separate wireless communication network service to provide a subscriber wireless network service quality evaluation.

16. A method for comparing wireless communication network services according to claim 15 wherein the messages of said first and second sets of preselected messages each comprise voice communications and wherein said steps of providing a quality grading comprise using voice recognition software.

17. A method for comparing wireless communication network services according to claim 15 including determining and recording a geographic location of the vehicle during each message sent from or received at the moving vehicle.

18. A method for comparing wireless communication network services according to claim 17 including determining the vehicle speed during each message sent from or received at the vehicle.

19. A method of comparing wireless communication network services according to claim 15 including a repetition of the steps of sending and receiving messages so that a plurality of additional pairs of first and second sets of messages are sent and received at the vehicle and fixed location prior to the step of comparing, each message of the first set of messages of said additional pairs of sets of messages being sent directly in response to the reception of a message of the previously sent second set of messages.

20. A system for comparing wireless communication network services comprising a mobile vehicle, means for mounting a plurality of wireless telephones for a plurality of different network services on said vehicle, means mounted in said vehicle for simultaneously sending through each of said telephones a first set of identical messages in digital format to a fixed location, means for determining the geographical location of the vehicle and for correlating such information with each message of said first set of messages, means mounted on said vehicle for receiving a second set of identical messages from said fixed location comprised of a message to each of said telephones in response to the reception at the fixed location of one of the first set of messages through a corresponding network service, and means mounted on said vehicle for quality grading each of the messages received whereby the quality of each of the different communication network services can be directly compared to provide a subscriber network service quality evaluation.

21. A system for comparing wireless communication network services according to claim 20 wherein said messages are voice communications and wherein said means for quality grading comprises voice recognition software.

22. A system for comparing wireless communication network services according to claim 20 including means for determining and recording the vehicle speed during each message sent from said vehicle.

23. A system for comparing wireless communication network services according to claim 20 including a mounting platform for mounting each of the telephones in general alignment at an elevation in the vehicle generally that of the driver's head.

\* \* \* \* \*